Patented Feb. 19, 1946

2,395,315

UNITED STATES PATENT OFFICE 2,395,315

N-HYDROCARBON SUBSTITUTED PYRROLIDINE SALTS OF MONO-NUCLEAR DINITRO-PHENOLS

Edgar C. Britton and John N. Hansen, Midland, Mich., assignors to The Dow Chemical Company, Midland, Mich., a corporation of Michigan No Drawing. Application August 29, 1941, Serial No. 408,810

7 Claims. (Cl. 167—31)

The present invention is concerned with N-hydro-carbon-substituted pyrrolidine salts of mono-nuclear dinitro-phenols and parasiticidal compositions in which they are employed as active toxicants. A particularly valuable group of compounds falling within the scope of the invention are those having the formula

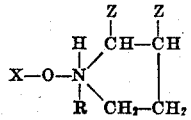

wherein X represents a mono-nuclear dinitroaryl radical, Z is selected from the group consisting of hydrogen and lower alkyl radicals, and R represents a member of the group consisting of alkyl, cycloalkyl, and aralkyl radicals.

We have prepared representative members of the above-identified group of compounds and found them to be valuable as parasiticidal toxicants. These compounds, for the most part, take the form of yellow to orange crystalline materials although in some instances oily products are obtained which crystallize with difficulty. The compounds are difficultly soluble in water, somewhat soluble in certain of the common organic solvents, relatively stable to light and air, and not appreciably affected by carbon dioxide.

The foregoing compounds may be prepared by reacting a suitable N-hydrocarbon-substituted pyrrolidine such as N-cyclohexyl-pyrrolidine, N-benzyl-pyrrolidine, N-butyl-pyrrolidine, N-isoamyl-3-methyl-pyrrolidine, etc., with a mono-nuclear dinitro-phenol. The reaction is conveniently carried out in benzene, alcohol, or other solvent for the reactants. Although any suitable amounts may be employed, substantially equimolecular proportions of the amine and phenol have been found to give the desired salts in good yield.

In carrying out the reaction the phenol and pyrrolidine compound may simply be mixed together whereby appreciable heat of reaction is evolved along with the formation of the desired salt compound. A preferred procedure comprises dissolving the mixture of phenol and pyrrolidine compound in a hot solvent such as alcohol or benzene, thereafter cooling the mixture and separating the precipitate as by filtration or decantation. The temperature of reaction is not critical. Minimum amounts of solvent are required when operating at temperatures of from 40° to 120° C.

In an alternate procedure the phenol may be dissolved in hot solvent and the pyrrolidine compound added portionwise thereto. When operating in this fashion, the temperature of reaction is conveniently maintained at the boiling temperature of the mixture. The crude reaction product may be utilized as a parasiticidal toxicant without further treatment. If desired, the product may be purified by recrystallization or by washing with small amounts of cold solvent to remove residual reactants present therein.

A preferred group of salts falling within the scope of the present invention has the following formula:

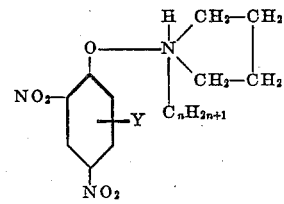

wherein $n$ is an integer, and Y represents one of the group consisting of alkyl, cycloalkyl, and aralkyl radicals. These compounds are particularly valuable for use in insecticidal and fungicidal compositions because of their exceptionally low solubility in water and their compatibility with other common parasiticidal toxicants.

It has been found that mixtures comprising the N-hydrocarbon-substituted pyrrolidine salts of mono-nuclear dinitro-phenols may be applied to growing plants in amounts sufficient to control infestations of many insect, mite, and fungus pests without materially injuring the host plant. The new salts may be employed as constituents of parasiticidal concentrates or incorporated directly into dust or spray compositions. For example, the toxicants may be compounded with carriers such as diatomaceous earth, bentonite, talc, sulfur, wood flour, inorganic phosphates, and gypsum, to form agricultural dusting compositions. By employing high concentrations of the salts in these dusts, compositions are obtained which may be employed as concentrates and thereafter diluted with additional solid carrier to form dusting compositions or suspended in water or other liquid carrier to form sprays. The new addition salts may be incorporated with various wetting, dispersing, and sticking agents to form concentrates for use in either dust or spray compositions. In such mixtures, the pyrrolidine salt compound may be present in any desired concentration.

The new addition salts may also be incorporated in other standard insecticidal and fungi-cidal compositions either as the sole toxic ingredient or in combination with pyrethrin, rotenone, cryolite, organic thiocyanates, sulfur, oils, copper sprays, arsenates, and related parasiticidal toxicants.

In the preparation of concentrates, from about 5 to about 80 per cent by weight of the addition salt is commonly employed. The preferred amounts incorporated in spray or dust compositions for application to living plants is between about 0.01 and 5 per cent by weight. The particular adaptation in which salt is employed and the concentration thereof in the final composition applied to the plant will depend upon the type of insect, mite, or fungus to be controlled, the circumstances under which such control is to be accomplished, and the tolerance of the host plant.

In a representative composition employed to determine the comparative toxicities of certain of the N-hydrocarbon-substituted pyrrolidine salts of mono-nuclear dinitrophenols, 18.2 parts by weight of the salt, 72.7 parts of diatomaceous earth, and 9.1 parts of sodium lauryl sulfate were ground together to form a dust product adapted to be dispersed by stirring with water. Throughout the examples, compositions of this formula are referred to as "standard test concentrates."

The following examples set forth specific embodiments of the invention but are not to be construed as limiting the same.

*Example 1*

2.6 parts by weight of 2.4-dinitro-6-cyclohexyl-phenol and 1.27 parts of N-normalbutyl-pyrrolidine were mixed together and dissolved in boiling ethyl alcohol. The mixture was thereafter cooled to room temperature and filtered to obtain 3.7 parts of the N-normalbutyl-pyrrolidine salt of 2.4-dinitro-6-cyclohexyl-phenol in the form of yellow crystals. This material was washed with cold alcohol and dried to obtain a substantially pure product melting at 118°–122° C. and substantially insoluble in water.

A standard test concentrate comprising the N-normal-butyl-pyrrolidine salt of 2.4-dinitro-6-cyclohexyl-phenol was diluted with sufficient water to form a spray composition comprising 0.5 pound of the salt per 100 gallons. This spray was applied to potato vines infested with the larvae of Colorado potato beetle and found to give a kill of 95 per cent. A similar concentrate comprising 16.6 parts by weight of the amine salt, 66 parts of diatomaceous earth, and 16.6 parts of sodium lauryl sulfate was diluted to give an aqueous spray containing 0.25 pound of the salt per 100 gallons. This spray was applied to bean foliage infested with red spiders and found to give a control of 99.9 per cent.

*Example 2*

3.96 parts by weight of 2.4-dinitro-6-methyl-phenol and 2.54 parts of N-normalbutyl-pyrrolidine were reacted together in alcohol substantially as described in Example 1. Upon filtration of the cooled reaction mixture there was obtained 4.9 parts of the N-normalbutyl-pyrrolidine salt of 2.4-dinitro-6-methyl-phenol as a bright yellow crystalline material melting at 78°–79° C. This compound was substantially insoluble in water.

A standard test concentrate comprising the foregoing salt compound was diluted with water to form a spray containing 0.5 pound of the salt per 100 gallons. This spray killed 85.9 per cent of adult red spiders on the bean foliage.

A composition comprising 1 pound of the amine salt per 100 gallons of 3 per cent mineral oil emulsion was found to give good control of the eggs of *L. kalmii* Stal.

*Example 3*

In a similar manner equimolecular proportions of N-normalbutyl-pyrrolidine and 2.4-dinitrophenol were reacted together to obtain the N-normalbutyl-pyrrolidine salt of 2.4-dinitrophenol as a viscous red oil, soluble in water to the extent of 0.299 gram per 100 milliliters at 25° C. A saturated water solution of this compound had a pH of 4.9.

*Example 4*

1.27 parts by weight of N-normalbutyl-pyrrolidine and 2.12 parts by weight of 2-ethyl-4.6-dinitro-phenol were mixed together. Appreciable heat of reaction was developed. The mixture was stirred and heated for a few minutes and thereafter cooled, whereupon the crude reaction product solidified. Upon recrystallization from hot ethyl alcohol, there was obtained the N-normalbutyl-pyrrolidine salt of 2-ethyl-4.6-dinitrophenol as a yellow crystalline compound melting at 72°–74° C. This compound was soluble in water to the extent 0.269 gram per 100 milliliters at 25° C. The saturated water solution had a pH of 6.7.

Other compounds falling within the scope of the present invention may be produced by reacting such amines as N-methyl-pyrrolidine, N-isopropyl-pyrrolidine, N-isoamyl-3-methyl-pyrrolidine, N-amyl-pyrrolidine, N-normalhexyl-pyrrolidine, N-octyl pyrrolidine, N-(3-methyl-normalheptyl)-3-normalbutyl-pyrrolidine, N-cyclohexyl-pyrrolidine, N-(4-methyl-cyclohexyl)-pyrrolidine, N-benzyl-pyrrolidine, N-phenyl-ethyl-pyrrolidine, etc., with such phenols as 2.4-dinitro-6-normalhexyl-phenol, 2.4-dinitro-6-normaloctyl-phenol, 2.4-dinitro-6-(2-methyl-cyclohexyl)-phenol, 2.4-dinitro-6-benzyl-phenol, 2.4-dinitro-carvacrol, 2.5-dinitro-4-cyclohexyl-phenol, 2.6-dinitro-4-methyl-phenol, and 2.4-dinitro-6-methoxy-phenol.

The N-hydrocarbon-substituted pyrrolidines employed as reactants in the foregoing examples may be prepared according to the method set forth in United States Patent No. 1,607,605.

We claim:

1. The N-normalbutyl-pyrrolidine salt of 2.4-dinitro-6-cyclohexyl-phenol having the formula:

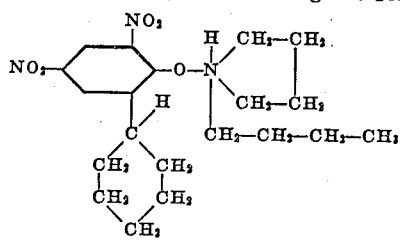

2. The N-normalbutyl-pyrrolidine salt of 2.4-dinitro-6-methyl-phenol having the formula:

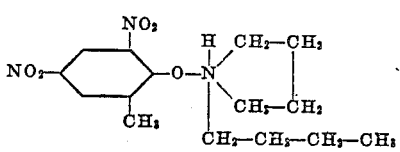

3. An insecticidal composition comprising a carrier and as an active toxicant the N-normal-butyl-pyrrolidine salt of 2.4-dinitro-6-cyclohexyl-phenol having the formula:

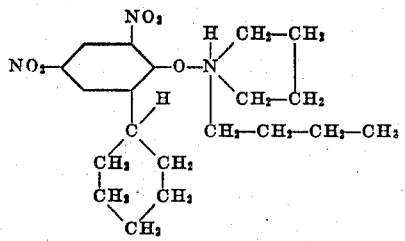

4. An insecticidal composition comprising a carrier and as an active toxic ingredient the N-normalbutyl-pyrrolidine salt of 2.4-dinitro-6-methyl-phenol having the formula:

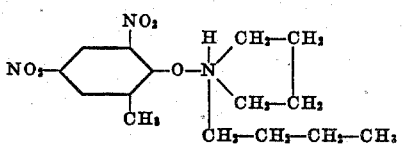

5. A compound having the formula

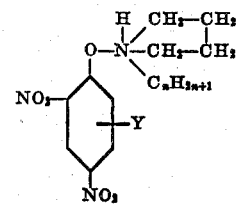

wherein $n$ is an integer and Y represents one of the group consisting of alkyl and cyclohexyl radicals.

6. A compound having the formula

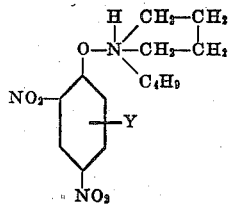

wherein Y represents one of the group consisting of alkyl and cyclohexyl radicals.

7. An insecticidal composition comprising a carrier and as an active toxicant a compound having the formula

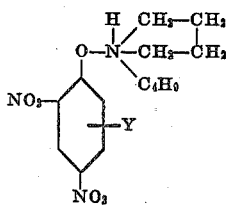

wherein Y represents one of the group consisting of alkyl and cyclohexyl radicals.

EDGAR C. BRITTON.
JOHN N. HANSEN.